United States Patent
Greulich-Hickmann et al.

(10) Patent No.: US 7,934,392 B2
(45) Date of Patent: May 3, 2011

(54) METHOD OF CONTINUOUSLY PRODUCING FLAT GLASS BY ROLLING

(75) Inventors: Norbert Greulich-Hickmann, Mainz (DE); Andreas Langsdorf, Ingelheim (DE); Ulrich Lange, Mainz (DE); Fritz Schroeder, Ingelheim (DE)

(73) Assignee: Schott AG, Mainz (DE)

( * ) Notice: Subject to any disclaimer, the term of this patent is extended or adjusted under 35 U.S.C. 154(b) by 652 days.

(21) Appl. No.: 11/180,062

(22) Filed: Jul. 13, 2005

(65) Prior Publication Data
US 2006/0010915 A1 Jan. 19, 2006

(30) Foreign Application Priority Data
Jul. 17, 2004 (DE) .......................... 10 2004 034 694

(51) Int. Cl.
*C03B 13/00* (2006.01)
*C03B 13/04* (2006.01)
*C03B 13/08* (2006.01)
*C03B 13/16* (2006.01)
*C03B 23/033* (2006.01)

(52) U.S. Cl. ............ 65/101; 65/25.1; 65/25.2; 65/25.3; 65/25.4

(58) Field of Classification Search .......... 65/25.1–25.3, 65/182.1, 182.4, 184, 101
See application file for complete search history.

(56) References Cited

U.S. PATENT DOCUMENTS

| | | | |
|---|---|---|---|
| 2,444,731 A * | 7/1948 | Devol | 65/25.3 |
| 3,137,556 A * | 6/1964 | Badger et al. | 65/182.2 |
| 3,554,725 A * | 1/1971 | Bracken et al. | 65/185 |
| 3,655,355 A | 4/1972 | Tissier | |
| 6,101,845 A * | 8/2000 | Kojima et al. | 65/101 |
| 6,311,523 B1 * | 11/2001 | Kojima et al. | 65/25.3 |
| 6,796,146 B2 * | 9/2004 | Burnham | 65/93 |
| 6,799,438 B2 * | 10/2004 | Herzbach et al. | 65/25.3 |
| 7,213,414 B2 * | 5/2007 | Shiraishi et al. | 65/25.3 |
| 2002/0102388 A1 * | 8/2002 | Burnham | 428/156 |
| 2003/0037573 A1 * | 2/2003 | Langsdorf et al. | 65/158 |

(Continued)

FOREIGN PATENT DOCUMENTS

EP 1 516 858 3/2005

(Continued)

OTHER PUBLICATIONS

Heinz G. Pfaender: "Schott Guide to Glass" in Chapman & Hall, London, Glasgow, Weinheim, New York, Tokyo, Melbourne, Madras, 1996, p. 52.

(Continued)

*Primary Examiner* — Matthew J Daniels
*Assistant Examiner* — Jodi Cohen
(74) *Attorney, Agent, or Firm* — Michael J. Striker

(57) ABSTRACT

The method of continuously producing flat glass includes rolling a fluid glass sheet between upper and lower shaping rollers to shape and calibrate the glass sheet, generating a respective gas cushion between the fluid glass sheet and each shaping roller from a liquid, controlling the pressure of the gas cushion between the fluid glass sheet and the upper shaping roller to completely prevent contact of the glass sheet with the upper shaping roller, controlling the pressure of the gas cushion between the fluid glass sheet and the lower shaping roller to form a linear contact area between the fluid glass sheet and the lower shaping roller and controlling the contact area width according to speed and viscosity of the glass sheet in order to transport it without slipping and reduce cooling path length.

9 Claims, 1 Drawing Sheet

U.S. PATENT DOCUMENTS

2003/0116910 A1 6/2003 Lautenschlager et al.
2004/0093900 A1* 5/2004 Fredholm .................. 65/25.3
2005/0103054 A1* 5/2005 Shiraishi et al. .................. 65/90

FOREIGN PATENT DOCUMENTS

| JP | 2001-180949 | | 7/2001 |
|----|-------------|---|--------|
| JP | 2002-47019 | | 2/2002 |
| JP | 2002182606 | * | 6/2002 |
| WO | 04/000738 | | 12/2003 |
| WO | 04/000738 A1 | | 12/2003 |

OTHER PUBLICATIONS

S. M. Rekhson:"Viscosity and Stress Relaxation in Commercial Glasses in . . . " Journal of Non-Crystalline Solids, vols. 38-39, Part 1, May-Jun. 1980, pp. 457-462, Published by Elsevier B.V.

* cited by examiner

METHOD OF CONTINUOUSLY PRODUCING FLAT GLASS BY ROLLING

BACKGROUND OF THE INVENTION

1. The Field of the Invention

The present invention relates to a method of continuously producing flat glass, such as sheet glass or window glass, by rolling, in which a fluid glass sheet is molded or shaped in a forming zone between at least two porous shaping rollers and conveyed by means of conveying rollers from the forming zone.

2. Related Art

The float glass process has the greatest versatility from among the many different methods of flat glass production, since the flat glass produced with that process has an excellent surface quality. However it also has the disadvantages that the investment costs for a float glass plant are very high and that one side of the float glass produced is contaminated with tin ions from the float bath, which is troublesome in many applications.

The glass quality, which was achievable by means of the float process, was not achieved by the drawing process, which was developed during the first quarter of the last century. Furthermore among other disadvantages these methods were susceptible to maintenance problems and sensitive to disturbance of the glass composition and temperature guidance and control in the drawing chamber.

The rolling method, also called the casting method, is one of the oldest methods for flat glass manufacture. In the rolling method a glass sheet flowing from a glass melt tank is formed or shaped between two cooled shaping rollers (calibrated) and subsequently is transported by means of conveying rollers into a cooling oven. Under these conditions a bulge is formed in the glass surface upstream of the upper shaping roller, the so-called upper roller. The apparatus for performing the method is simple, but has the disadvantage that the resulting glass surface has an image or imprint, which more or less matches the shape of the surfaces of the shaping rollers. This generally damages the surface quality, but it can be desired as in ornamental glass manufacture. Prior to the introduction of float glass the raw glass for mirror manufacture was produced first by rolling and subsequently by grinding and polishing both sides. Currently wired or armored glass and ornamental glass, which is made by shaping with a profiled or shaped lower roller, are the typical rolled glass products.

The surface temperature of the shaping roller cannot be freely selected. A surface temperature that is too high leads to adherence of the glass on the roller. However a surface temperature that is too low leads to too strong cooling of the glass and to breakage of the glass between the shaping rollers. On the other hand insufficient cooling leads to a too soft sheet and has a negative effect on the dimensional stability of the flat glass, especially its thickness. Thus the plant performance (flat glass throughput) has an upper limit determined by the cooling power realized under these conditions. A high throughput can be achieved with large roller diameters. For example, a throughput of about 7 m min$^{-1}$ of flat glass can be achieved with a glass sheet thickness of about 3 mm with a roller diameter of over 0.4 m. With smaller roller diameters of less than 0.2 m the throughput drops to less than half of this value. Generally it can be said that the sheet speed with constant glass throughput (amount) is inversely proportional to the thickness of the sheet. Repeated attempts to improve the surface quality of rolled glass are based on the low apparatus expenses associated with the rolling process. It has been long known to produce glass articles of outstanding surface quality by blowing a rotating glass gob in paste form. In this latter method the glass surface slides on a gas film between the glass and a forming body, which is produced by evaporation of water from the paste.

This principle has already been transferred to roller glass manufacture. Thus e.g. from JP (A) 2001-180949, it is known to shape a glass sheet between three porous roller pairs, which are acted on from the interior with an evaporating liquid, water. The liquid evaporates at the working temperature of the rollers and the vapor escapes through the pores. The glass sheet is then prevented from coming into contact with the roller material and its surface defects because of the vapor cushions arising on the outside of the rollers.

U.S. Pat. No. 3,137,556 A discloses a method, in which the glass sheet is shaped between only two porous rollers, on whose surfaces gas cushions are formed.

WO 2004/000 738 A1 teaches a similar method, which likewise manages with a roller pair. The liquid glass sheet is conducted in an S-shaped manner over the rollers, and a gas cushion prevents contact of the rollers with the glass sheet. Subsequently the glass sheet is conducted to a conveyor belt, on whose surface a gas cushion is similarly formed, in order to prevent contact of the glass surface with the conveyor belt.

Flat glass with a better surface quality may be made with this method, whereby a surface quality of fire-polished glass may be obtained. However the circumstances that the gas and vapor in this method have a clearly poorer thermal conductivity than metallic or ceramic roller material is disadvantageous. As a result the glass sheet is cooled slower than it would if it were in contact with the generally metallic roller material. Thus a more expensive guidance of the viscous glass sheet by several roller pairs acted on with a gas cushion (JP(A) 2001-180949) or by a conveyor belt provided with a gas cushion (WO 2004/000 738 A1) is required. Also a longer cooling path must be selected, which is not always easy and is associated with contingent rebuilding of the existing apparatus and in each case with higher costs. Above all, it is not always possible to control the frequently occurring slipping, Which impairs the operation of the plant and because of that can lead to quality problems.

SUMMARY OF THE INVENTION

It is an object of the present invention to provide a method for continuously producing flat glass by rolling, in which glass may be produced largely without damage to its surface, which is easily controllable and which largely maintains the current comparatively short cooling path length provided by conventional rolling methods.

These objects are obtained by the method claimed in the appended independent method claim.

These objects, and others which will be made more apparent hereinafter, are attained in a method of continuously producing flat glass by rolling a fluid glass sheet between at least two shaping rollers while generating a gas cushion between the shaping rollers and the glass sheet.

According to the invention a gas pressure of the gas cushion at one of the shaping rollers is adjusted, so that a linear contact area between the one of the shaping rollers and the glass sheet is formed and the linear contact area extends parallel to an axis of the one of the shaping rollers.

In the method according to the invention the glass strand is calibrated between two shaping rollers. At one of the shaping rollers contact between that roller and the glass sheet is completely avoided by generation of a gas cushion between that roller and the glass sheet. At the other shaping roller gas pressure between the other shaping roller and the glass sheet is adjusted so that a linear contact area is formed between the other shaping roller and the glass sheet, which is parallel to the roller axis.

However it is essential that the direct contact between the shaping rollers and the glass sheet is prevented as long as possible so that only a linear contact area exists. A substantially slip-free transport and a more sufficient cooling of the glass sheet are guaranteed by this direct contact between the glass sheet and the shaping roller.

The width of the linear contact area should be dimensioned so that forces for slippage-free transport of the glass sheet can be transmitted from the shaping roller to the glass sheet. Generally this is successful when the width of the linear contact area is from 0.5 to 3 cm. The required width depends, among other things, on the viscosity and the speed (m min$^{-1}$) of the glass sheet. Higher speeds and lower viscosities result in wider contact area; higher glass viscosities and lower drawing speeds require smaller contact areas with a constant steam throughput rate. The width of the contact zone influences the cooling efficiency of the rollers. The wider is the contact zone, the better the cooling of the glass sheet.

When the rollers coming in contact with the glass sheet are provided with a surface structure, e.g. with grooves, knobs, beads or bulges or otherwise plastic structures, the contact area must be at least so wide in the transport direction of the sheet that the surface structure can be completely and clearly formed on the glass sheet. When the surface quality of the glass on the side provided with the surface structure is of no special value, the method can operate without or with very small gas pressure, so that the width of the contact area corresponds to that of a conventional roller. In this case then a conventional roller would be usable without a gas cushion, however in this case the use of a roller with gas pressure has the advantage that the roller is colder because of the evaporated water quantity, which generally would considerably shorten the connected cooling path.

The width of the linear contact area is controlled in a known manner by the gas pressure between the shaping roller and the glass sheet. The gas pressure is selected so high at one of the shaping rollers so that no contact occurs between the glass sheet and the shaping roller and the glass sheet on this side has a fire-polished surface on this side. At the other shaping roller the gas pressure is controlled so that a linear contact area of the desired width is formed.

The gas supply to the rollers occurs as usual from the interior of the shaping rollers. For this purpose an open-pored roller is used, in whose interior pressurized gas (air, nitrogen, steam) or a volatile liquid, especially distilled water, is conducted under production conditions.

Water is the most economical means for producing a gas pressure, since water vapor or steam does not react with glass and is not toxic.

The gas pressure is substantially controlled by the pore size of the roller material and the vapor pressure of the supplied water when water vapor or steam is supplied by evaporation of water in the interior of the roller. The water supply rate to the roller should be controlled and dimensioned so that the water evaporates within the porous roller structure and no liquid water reaches the outer surface of the roller.

The rollers are generally cooled sufficiently by the evaporation of the water when evaporating water is used. In contrast when pressurized gas, such as air or the like is used, the roller must be provided with additional cooling means, e.g. a cooling coil or ducts in its interior, since the small heat capacity of a gas is not sufficient for effective cooling.

The open-pored material, which is used to make at least a part of the roller, is preferably sintered metal or porous ceramic. The rapidity of the evaporation process and the intensity of the heat exchange may be regulated to a certain extent by the properties of the open-pored material. A lower thermal diffusion number $a=\lambda/c\gamma$ and a high porosity (e.g. about 30 to 40%) makes the vapor or gas formation easier and leads to a lower heat flow density between the glass and the open-pored material (e.g. about 10 to $20\times10^3$ W/m$^2$) while a high thermal diffusion number (e.g. in the case of bronze as the sintered material) and a low porosity (e.g. in the range of about 5 to 10%) delays evaporation and increases the heat exchanged (obtained heat flow density e.g. in a range between about 50 to $100\times10^3$ W/m$^2$). A delay of the evaporation and a resulting increase in heat exchange may result and above all cause a correspondingly high pressure to be used (e.g. 0.5 MPa and above).

Suitable ceramic materials contain metal oxides, metal carbides and metal nitrides, such as aluminum oxide, zirconium oxide, silicon carbide or silicon nitride or mixtures thereof and compounds of that, e.g. silicon aluminum dinitride (Sialon). Also glassy carbon is suitable.

Platinum, stainless steel, nickel, chromium alloys and other thermally highly loadable alloys can be used, among others, as the metal. Chromium-Nickel-Steel with an open porosity of about 5 to 30% pores and a pore diameter between 0.5 and 50 µm is a concrete example of a suitable metal.

The rollers can be constructed asymmetric with a larger pore structure in the interior and a finer pore structure on their side facing the glass. In this case the fine-pore structure has a pore size range according to the individual application of from 0.5 to 10 µm ($d_{50}$-value), while the large-pore structure with a pore size between 2 and 100 µm ($d_{50}$ value) provides mechanical stability. One such asymmetric structure has the advantage that the flow resistance is less than a roller entirely consisting of fine-pored material, which leads to a lowering of the operating costs, so that the fine-pored section can be made of a more expensive material than the large-pored supporting section that supports it. Also the fine-pored section naturally causes less surface defects when it contacts the glass. A pore size of from 0.5 to 10 µm ($d_{50}$-value) is preferred at least for the roller coming in contact with the glass sheet.

Furthermore it is also possible to vary the porosity of the roller coming in contact with the glass sheet axially so that a discontinuous linear contact area is formed, which extends over the entire roller width. If a reduced pressure is used only in the edge region of the roller, contact between the roller and the glass sheet occurs in the edge region of the glass sheet, while the region of the glass sheet between the edges has no contact with the roller and thus an improved surface quality. If the width of the contact region is selected so that the forces required for the sheet transport are still transmitted from the roller to the glass sheet, one can produce a special flat glass with an especially higher surface quality. Generally it is sufficient for this purpose when the linear contact area corresponds to about 2 to 5% of the usable roller width.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
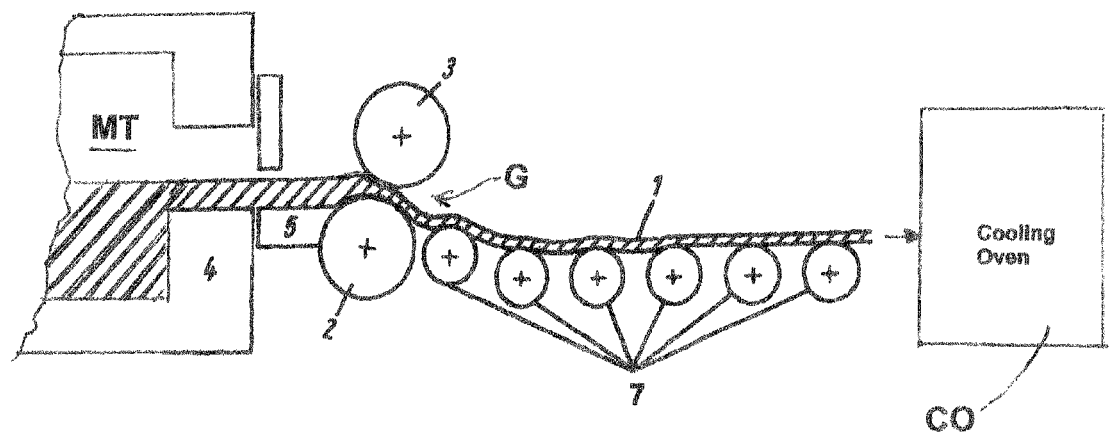
FIG. 1 is a schematic cross-sectional view of a rolling plant for performing the method for continuously producing flat glass according to the invention.
Figure 2:
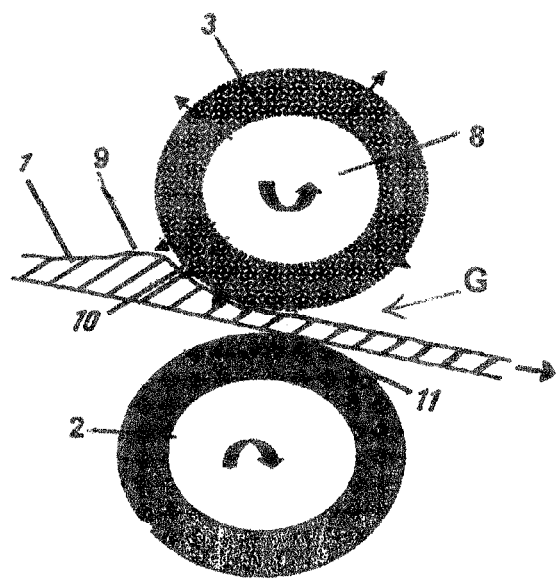
FIG. 2 is a cross-sectional view through a pair of shaping rollers in a rolling plant for performing the method according to the invention.

The glass sheet issuing from the glass melt tank MT over the weir 4 travels over the machine slab 5 into the gap G between the upper shaping roller 3 and the lower shaping roller 2 as shown in FIG. 1. The glass sheet 1 is calibrated in the roller gap G between the oppositely rotating rollers 2 and 3 and then conveyed into the cooling oven CO by means of the conveying rollers 7. The rotation axle 8 of the upper roller 3 is hollow and water flows through it. The roller body of the upper shaping roller 3 is made of porous metal, as shown by the dots in the FIG. 2. The metal of the upper roller 3 has a sufficient temperature resistance and is preferably Inconel® or Hastelloy® alloy. The water conducted through the hollow rotating axle 8 partly enters the porous roller body and evaporates within the roller body. The water within the porous roller body evaporates because of an appropriate control of the pressure of the water conducted through the hollow rotating axle. It is important that the water input rate into the roller is adjusted according to the porous structure of the roller material (pore size distribution, permeability of the pore volume) and the drawing speed, so that the water input into the porous structure completely evaporates within the roller material, i.e. the phase boundary between liquid and gaseous water is located between the inner diameter and outer diameter of the porous material.

As shown by the arrows through the roller body the water enters into the porous structure of the hollow cylindrical upper shaping roller 3, which comprises sintered metal, and escapes from the outer side or surface of the upper roller 3 as steam. Because of that a gas cushion 10 is formed between the glass sheet 1 and the upper roller 3 with a predetermined pressure such that direct contact between the boy material of the upper roller 3 and the glass sheet, even in the vicinity of the built-up bulge 9, is prevented. Thus the glass sheet has a fire-polished upper surface. The lower shaping roller 2 is constructed like the upper roller. Also in the case of the lower shaping roller 2 water enters the interior of the roller and into the porous metal of the roller body and evaporates there in the interior of the roller so that a gas cushion is formed on the outside of the lower shaping roller 2. Generally the pressure of the gas cushion is small enough so that an approximately 2 cm contact zone 11 is formed, which parallels the rotation axis of the roller. The smaller pressure of the gas cushion can be produced by reducing the pressure of the water conducted into the interior of the lower roller 2 in comparison to that for the upper roller 3. In the embodiment shown in the drawing the smaller pressure is generally produced by means of a finer porosity (smaller pore size), represented in FIG. 2 by the finer dots. The glass is sufficiently strongly cooled at the contact position by direct contact between the lower roller 2 and the glass sheet 1, so that it is dimension stable. However at the same time the contact zone is kept small by the forming gas cushion in comparison to a roller that comprises a non-porous metal, so that the surface defects of the roller formed in the glass are smaller, since the number of possible glass faults increases logically with the increasing width of the contact surface. A small permeability is preferred for the lower roller 2 because the process can be more easily controlled because of that. With high permeability it is difficult to impossible to keep the phase boundary between vapor and liquid within the porous material.

The advantages obtained with the invention, above all, are that a glass sheet can be produced, which has a fire-polished surface on one side and a surface quality on the other side, which is definitely better than the quality obtainable by a conventional completely metal roller. Also this other side can have a structured surface. In addition, the present, but small, contact area between the roller surface and the glass sheet prevents slipping between the roller and the glass sheet. At the same time cooling of the glass sheet occurs due to the direct contact, so that the connected cooling path is kept short.

EXAMPLE

A glass flow coming from a glass melt tank at a temperature of about 1400° C. was rolled between two shaping rollers 2, 3 with a diameter of 160 mm, which rotate a 4 rpm. The rollers had a spacing of 4 mm from each other. The upper shaping roller comprises a hollow cylinder with a porous cylindrical jacket having a thickness of 45 mm, a porosity of 50% and permeability for water of $1 \times 10^{-13}$ $m^2$. The upper shaping roller was acted on with distilled water under a pressure of 250 kPa. The lower shaping roller was constructed in the same manner. In operation the temperature of the roller surfaces was about 400° C. to 450° C. A gas cushion of less than or equal to 0.1 mm formed between the upper roller and the glass sheet by steam vaporized in the pores of the upper shaping roller. The pressure was adjusted in the lower shaping roller so that a contact zone of a 5 to 30 mm width resulted between the lower shaping roller and the glass sheet. The surface quality of the upper surface of the resulting glass sheet corresponds approximately to that of a fire-polished glass sheet, while the side of the glass sheet coming in contact with the lower roller had a quality that was noticeably better than that produced by the conventional method. Although the heat transfer through the upper shaping roller because of the gas cushion is less than it would be by direct contact, the length of the subsequent cooling path need not be increased.

The disclosure in German Patent Application 10 2004 034 694.1-45 of Jul. 17, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method for continuously producing flat glass by rolling, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A rolling method of continuously producing flat glass, said method consisting of the steps of:
   a) supplying a fluid glass sheet from a glass melt tank;
   b) rolling the fluid glass sheet issuing from the glass melt tank between an upper shaping roller and a lower shaping roller to shape and to calibrate the glass sheet in a roller gap between the upper shaping roller and the lower shaping roller, wherein said upper shaping roller is arranged above said lower shaping roller, said glass sheet passes under the upper shaping roller and over the lower shaping roller, and wherein said upper shaping roller and said lower shaping roller are each hollow, provided with an interior, and made of a porous open-pored material having a pore structure;

c) generating a gas cushion between said fluid glass sheet and said upper shaping roller from an evaporating liquid by supplying said evaporating liquid to said interior of said upper shaping roller at a fluid pressure controlled, so that a phase boundary between vapor from the evaporating liquid and the evaporating liquid is maintained within the porous open-pored material of the upper shaping roller;

d) controlling a gas pressure of said gas cushion between said fluid glass sheet and said upper shaping roller in order to completely avoid contact between said fluid glass sheet and said upper shaping roller so as to form a glass surface on an upper side of the glass sheet having a quality corresponding to that of a fire-polished surface;

e) generating another gas cushion between said fluid glass sheet and said lower shaping roller from said evaporating liquid by supplying said evaporating liquid to said interior of said lower shaping roller at another fluid pressure controlled so that a phase boundary between vapor from the evaporating liquid and the evaporating liquid is maintained within the porous open-pored material of the lower shaping roller;

f) controlling a gas pressure of said another gas cushion between said fluid glass sheet and said lower shaping roller, so that a linear contact area is formed between said fluid glass sheet and a roller surface of said lower shaping roller, said linear contact area extending parallel to an axis of said lower shaping roller;

g) controlling a width of said linear contact area between said fluid glass sheet and said lower shaping roller according to a speed and viscosity of the glass sheet, so that the glass sheet is transported without slipping and the glass sheet is sufficiently cooled so as to be dimension stable; and h) after the glass sheet is rolled between the upper shaping roller and the lower shaping roller conveying in the glass sheet into a cooling oven by means of conveying rollers located downstream of the upper shaping roller and the lower shaping roller, in order to obtain the flat glass.

2. The method as defined in claim 1, wherein said roller surface of said lower shaping roller has a surface structure with respective grooves, knobs, beads, or bulges and the width of said linear contact area is further controlled, so that a corresponding surface structure is formed on said side of said glass sheet that contacts said lower shaping roller.

3. The method as defined in claim 1, wherein said controlling of said gas pressure of the gas cushion between said fluid glass sheet and said upper shaping roller comprises selecting and/or adjusting a pore size of pores of said porous open-pored material of said upper shaping roller and/or adjusting the fluid pressure acting on the evaporating liquid supplied to the porous open-pored material of said upper shaping roller, and wherein said controlling of said gas pressure of the another gas cushion between said fluid glass sheet and said lower shaping roller comprises selecting and/or adjusting a pore size of pores of said porous open-pored material of said lower shaping roller and/or adjusting the fluid pressure acting on the evaporating liquid supplied to the porous open-pored material of said lower shaping roller.

4. The method as defined in claim 1, wherein said linear contact area between the glass sheet and the roller surface of said lower shaping roller has a width corresponding to about 2 to 5% of a usable roller width.

5. The method as defined in claim 1, wherein said linear contact area has a width of from 0.5 to 3 cm in a direction of travel of the glass sheet.

6. The method as defined in claim 5, wherein said width is from 1 to 2 cm.

7. The method as defined in claim 1, wherein the gas pressure in the gas cushion between the glass sheet and the lower shaping roller is adjusted differently in different parts of the lower shaping roller, so that the linear contact area is discontinuous and has different widths in different sections.

8. The method as defined in claim 1, wherein said evaporating liquid is water.

9. The method as defined in claim 1, wherein the open-pored material is a sintered metal or a porous ceramic.

* * * * *